US00RE44387E

(19) United States
(12) Reissued Patent
Bridges et al.

(10) Patent Number: US RE44,387 E
(45) Date of Reissued Patent: Jul. 23, 2013

(54) CONTAINER WITH LOCKING SYSTEM

(75) Inventors: Tobias McKay Bridges, Holly Springs, NC (US); Mikel Janitz, Sapulpa, OK (US)

(73) Assignee: Apex Brands, Inc., Sparks, MD (US)

(21) Appl. No.: 13/607,297

(22) Filed: Sep. 7, 2012

Related U.S. Patent Documents

Reissue of:
(64) Patent No.: 7,823,741
Issued: Nov. 2, 2010
Appl. No.: 11/867,243
Filed: Oct. 4, 2007

(51) Int. Cl.
*B65D 45/16* (2006.01)

(52) U.S. Cl.
USPC ..... 220/326

(58) Field of Classification Search
USPC ..... 220/326, 324, 318, 315, 830, 827, 220/826, 810, 4.33, 4.28, 525, 524, 523, 220/4.01, 500, 200, 7, 6, FOR. 192, 23.83; 217/57, 56, 45, 43 R, 36, 5; 292/216, 228, 292/225, 220, 219, 195, DIG. 21, DIG. 30, 292/DIG. 61; 49/395, 394; 70/54, 55, 56, 70/DIG. 64, DIG. 65; 109/67; 312/107.5, 312/215, 216, 218, 220, 109, 326, 329
See application file for complete search history.

(56) References Cited

U.S. PATENT DOCUMENTS

| | | | | | |
|---|---|---|---|---|---|
| 367,239 | A | * | 7/1887 | Roth | 312/216 |
| 995,712 | A | * | 6/1911 | Pickering | 220/7 |
| 1,424,531 | A | * | 8/1922 | De Kalb | 312/216 |
| 1,610,798 | A | * | 12/1926 | Kowalski | 109/59 R |
| 1,712,842 | A | * | 5/1929 | Richardson | 312/196 |
| 1,818,525 | A | * | 8/1931 | Perez | 190/3 |
| 1,909,848 | A | * | 5/1933 | Rand | 312/218 |
| 2,863,691 | A | * | 12/1958 | Carpenter | 292/340 |
| 2,967,080 | A | * | 1/1961 | Nelson | 312/216 |
| 3,786,693 | A | | 1/1974 | Keipert | |
| 3,856,373 | A | * | 12/1974 | Tucich | 312/216 |
| 4,194,100 | A | * | 3/1980 | Cox et al. | 200/50.15 |
| 4,397,389 | A | | 8/1983 | Findeisen | |
| 4,421,215 | A | | 12/1983 | Bellah et al. | |
| 4,501,378 | A | | 2/1985 | Berfield | |
| 4,966,423 | A | * | 10/1990 | Higuera et al. | 312/221 |
| 5,042,853 | A | * | 8/1991 | Gleason et al. | 292/126 |
| 5,100,015 | A | | 3/1992 | Vanderstuyf | |

(Continued)

FOREIGN PATENT DOCUMENTS

| | | | | |
|---|---|---|---|---|
| FR | 2610034 | A | * | 7/1988 |
| JP | 54113040 | A | * | 9/1979 |

*Primary Examiner* — Mickey Yu
*Assistant Examiner* — Robert J Hicks
(74) *Attorney, Agent, or Firm* — Nelson Mullins Riley & Scarborough, LLP

(57) ABSTRACT

A container includes a receptacle having walls, a floor, and an open side. The container includes first and second doors. At least one first latch unit is operatively associated with the first door and is movable between a latched position and an unlatched position. At least one second latch unit is operatively associated with the second door and is movable between a latched position and an unlatched position. A locking system for moving the first and second latch units between the latched and the unlatched positions includes a locking member movable between a first position in which the locking member moves the first latch unit of the first door from the latched to the unlatched position and a second position in which the locking member moves the second latch unit of the second door from the latched to the unlatched position.

43 Claims, 16 Drawing Sheets

U.S. PATENT DOCUMENTS

| | | | | |
|---|---|---|---|---|
| 5,235,830 | A | 8/1993 | Benge | |
| 5,791,174 | A | 8/1998 | Fitzgerald et al. | |
| 6,238,024 | B1 * | 5/2001 | Sawatzky | 312/221 |
| 6,494,064 | B1 | 12/2002 | Pena | |
| 6,705,306 | B1 | 3/2004 | Dickey | |
| 6,772,613 | B2 | 8/2004 | Webb et al. | |
| 6,851,288 | B2 | 2/2005 | Howes | |
| 7,090,094 | B2 | 8/2006 | Wade et al. | |
| 7,284,673 | B2 | 10/2007 | Habeger et al. | |
| 7,416,228 | B2 | 8/2008 | Pfitzinger et al. | |
| 7,418,846 | B2 | 9/2008 | James et al. | |
| 7,494,418 | B2 | 2/2009 | Rifkin et al. | |
| 7,740,147 | B1 | 6/2010 | Gilbert | |
| 2001/0032848 | A1 | 10/2001 | Jones et al. | |
| 2002/0185943 | A1 * | 12/2002 | Gentili et al. | 312/221 |
| 2005/0284344 | A1 * | 12/2005 | Alizade | 109/49.5 |
| 2006/0101874 | A1 * | 5/2006 | Mikolajczyk et al. | 70/84 |
| 2008/0184598 | A1 | 8/2008 | Handel et al. | |
| 2008/0203862 | A1 * | 8/2008 | Sevillano Gil | 312/216 |
| 2010/0050712 | A1 | 3/2010 | Tong et al. | |

* cited by examiner

CONTAINER WITH LOCKING SYSTEM

Matter enclosed in heavy brackets [ ] appears in the original patent but forms no part of this reissue specification; matter printed in italics indicates the additions made by reissue.

FIELD OF THE INVENTION

The present invention is directed generally to containers, and more specifically to containers with integrated locking systems.

BACKGROUND

A variety of industrial storage containers are available for storing tools or other devices. These storage containers can include several doors. The doors can be locked to prevent unauthorized access to the contents of the storage containers. In addition, the doors can be closed in a latched position without being locked.

Many industrial containers include two or more doors. For example, typical field office storage units include three doors. A large upper door covers the upper portion of the field office container and is attached by a hinge on the ceiling or top wall of the container. Two smaller doors each cover respective side portions of the lower part of the container. The two smaller doors are attached by hinges on opposing side walls of the container. A locking mechanism is positioned on a panel between the two lower doors, which simultaneously opens all of the doors with one movement.

SUMMARY OF EMBODIMENTS OF THE INVENTION

According to some embodiments of the invention, a container includes a receptacle having walls, a floor, and an open side. The container includes first and second doors. Each of the first and second doors are pivotally attached to a respective wall of the receptacle, and are being movable between an open position, in which a portion of the open side of the receptacle can be accessed, and a closed position, in which the first and second doors overlie the open side of the receptacle. At least one first latch unit is operatively associated with the first door and is movable between a latched position, in which the first door is maintained in the closed position, and an unlatched position, in which the first door is movable between the open and the closed positions. At least one second latch unit is operatively associated with the second door and is movable between a latched position, in which the second door is maintained in the closed position and an unlatched position, in which the second door is movable between the open and the closed positions. A locking system is coupled to the first and second latch units for moving the first and second latch units between the latched and the unlatched positions includes a locking member movable between a first position, in which the locking member moves the first latch unit of the first door from the latched to the unlatched position, and a second position, in which the locking member moves the second latch unit of the second door from the latched to the unlatched position.

According to further embodiments of the present invention a container includes a receptacle having walls, a floor, and an open side. First, second and third doors are pivotally attached a respective one of the walls of the receptacle. Each of the first, second and third doors are movable between an open position, in which a portion of the open side of the receptacle can be accessed, and a closed position, in which the first, second and third doors overlie the open side of the receptacle. At least one first latch unit is operatively associated with the first door and is movable between a latched position, in which the first door is maintained in the closed position, and an unlatched position, in which the first door is movable between the open and closed positions. At least one second latch unit is operatively associated with the second door and is movable between a latched position, in which the second door is maintained in the closed position, and an unlatched position, in which the second door is movable between the open and closed positions. At least one third latch unit is operatively associated with the third door and is movable between a latched position, in which the third door is maintained in the closed position, and an unlatched position, in which the third doors movable between the open and closed positions. A locking system coupled to the first, second and third latch units for moving the first, second and third latch units between the latched and the unlatched position includes a locking member movable between a first position, in which the locking member moves the first latch unit of the first door from the latched to the unlatched position, a second position, in which the locking member moves the second latch unit of the second door from the latched to the unlatched position, and a third position, in which the locking member moves the third latch unit from a latched to the unlatched position.

BRIEF DESCRIPTION OF THE DRAWINGS

The accompanying drawings, which are incorporated into and constitute a part of the specification, illustrate embodiments of the invention and, together with the description, serve to explain principles of the invention.

DETAILED DESCRIPTION OF EMBODIMENTS OF THE INVENTION

Figure 1:
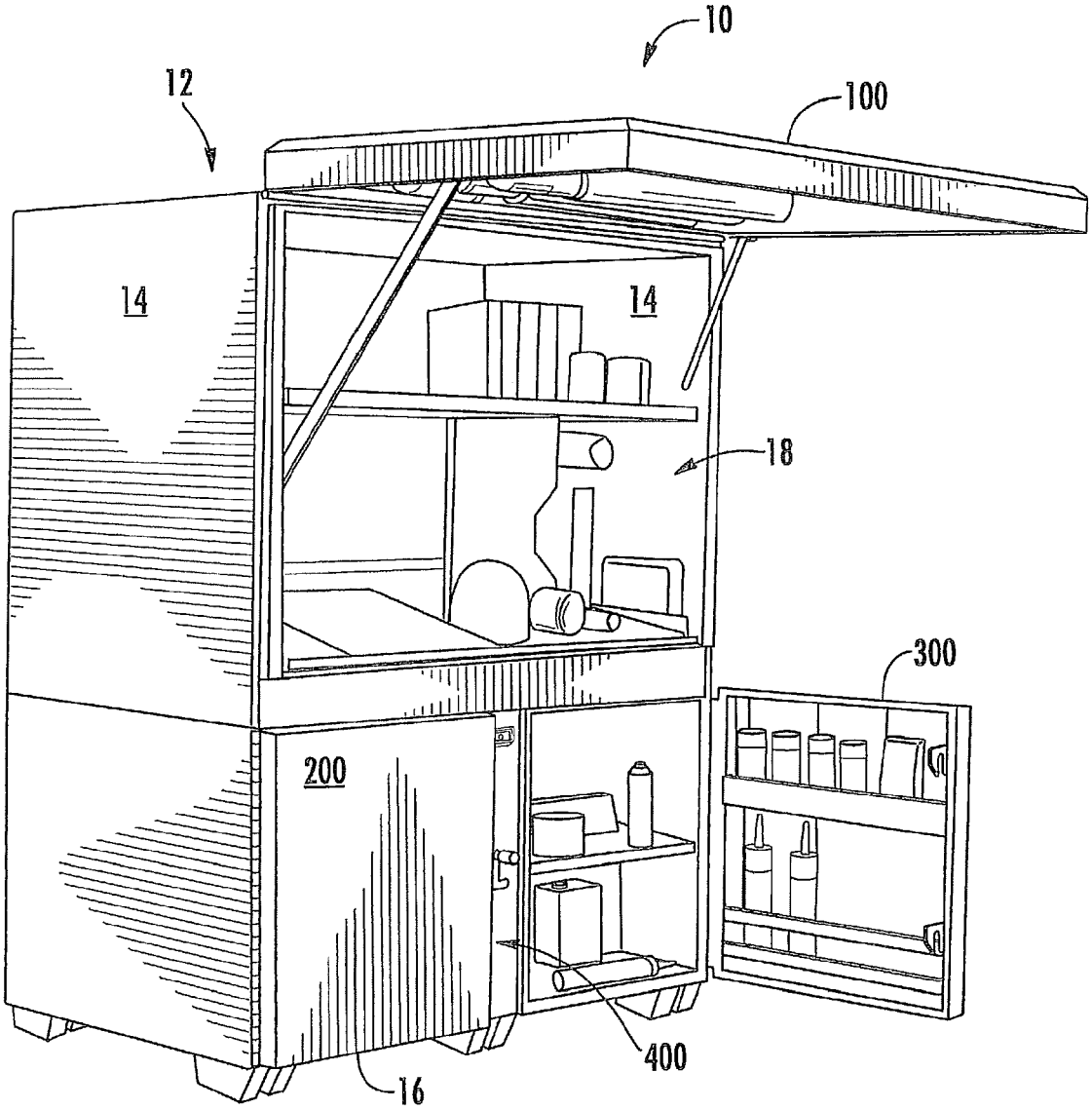
FIG. 1 is a perspective view of a container or field office box with three doors according to embodiments of the present invention.

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, these elements should not be limited by these terms. These terms are only used to distinguish one element from another element. Thus, a "first" element could also be termed a "second" element without departing from the teachings of the present invention. The sequence of operations (or steps) is not limited to the order presented in the claims or figures unless specifically indicated otherwise.

With reference to FIG. 1, a container 10 includes a receptacle 12, walls 14, a floor and an open side 18. Three doors 100, 200 and 300 are pivotally attached to a respective ceiling or wall 14 of the receptacle 12. The doors 100, 200 and 300 are movable between an open position, in which a portion of the open side 18 of the receptacle 12 can be accessed, and a closed position, in which the doors 100, 200 and 300 overlie a portion of the open side of the receptacle.

Figure 11:
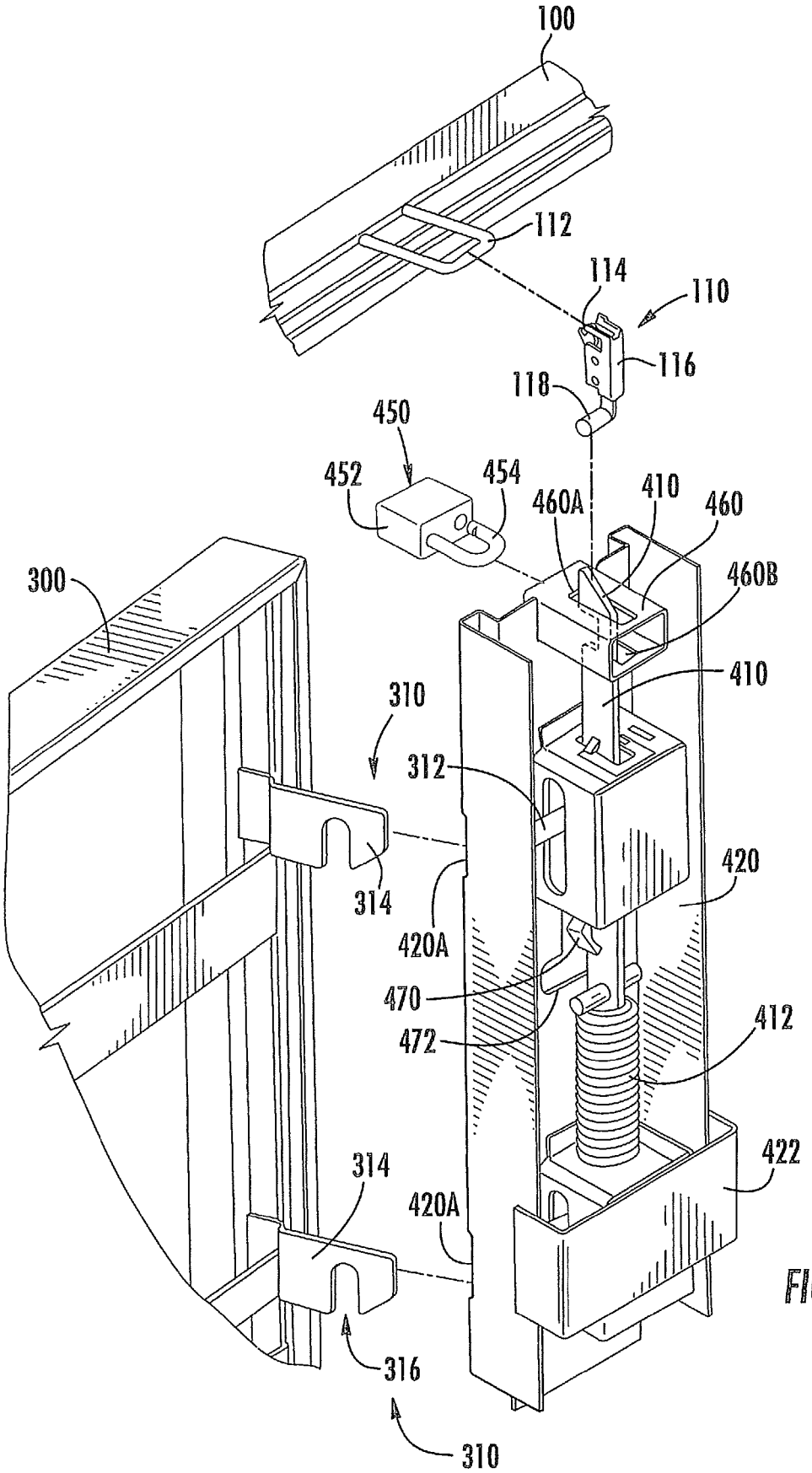
FIG. 11 is an exploded perspective view of the locking system and container of FIGS. 6 and 7.
Figure 12:
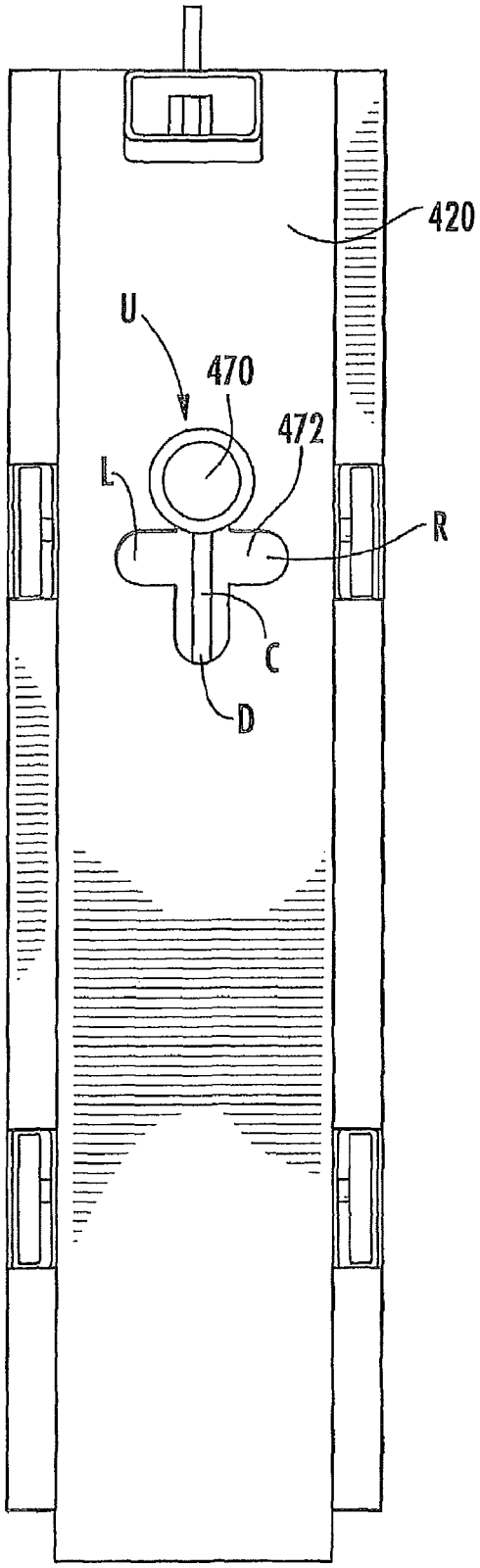
FIG. 12 is a front view of an alternative locking system for the container of FIG. 1 according to further embodiments of the present invention.

As illustrated in FIGS. 2-8 and FIG. 11, three latch units 110, 210 and 310 are operatively associated with the doors 100, 200 and 300, respectively. A locking system 400 is positioned between the doors 200 and 300 and under the door 100. The locking system 400 includes a locking member or bar 410 with a tapered top end 410A and notch 410B, a biasing member or spring 412, and a bracket 414 with a slot 416 that includes a retaining portion 416A. The locking system 400 is mounted on the receptacle 12 by a support bracket 420 and is further supported by brackets 414 and 424. A blocking member or padlock 450 includes a body 452 and a hook 454 (FIG. 11) and is positioned in a padlock bracket 460 such that the body 452 is accessible from the outside of the receptacle 12. As shown in FIG. 11, the bracket 460 includes an upper opening 460A and a lower opening 460B, which permits vertical movement of the locking member 410 when the padlock 450 is in an opened position. The bracket 420 includes openings 420A and an outer cover 422. A handle 470 is mounted on the locking bar 410 and passes through an opening or slot 472 such that the handle 470 is accessible from the outside of the receptacle 12.

Figure 2:
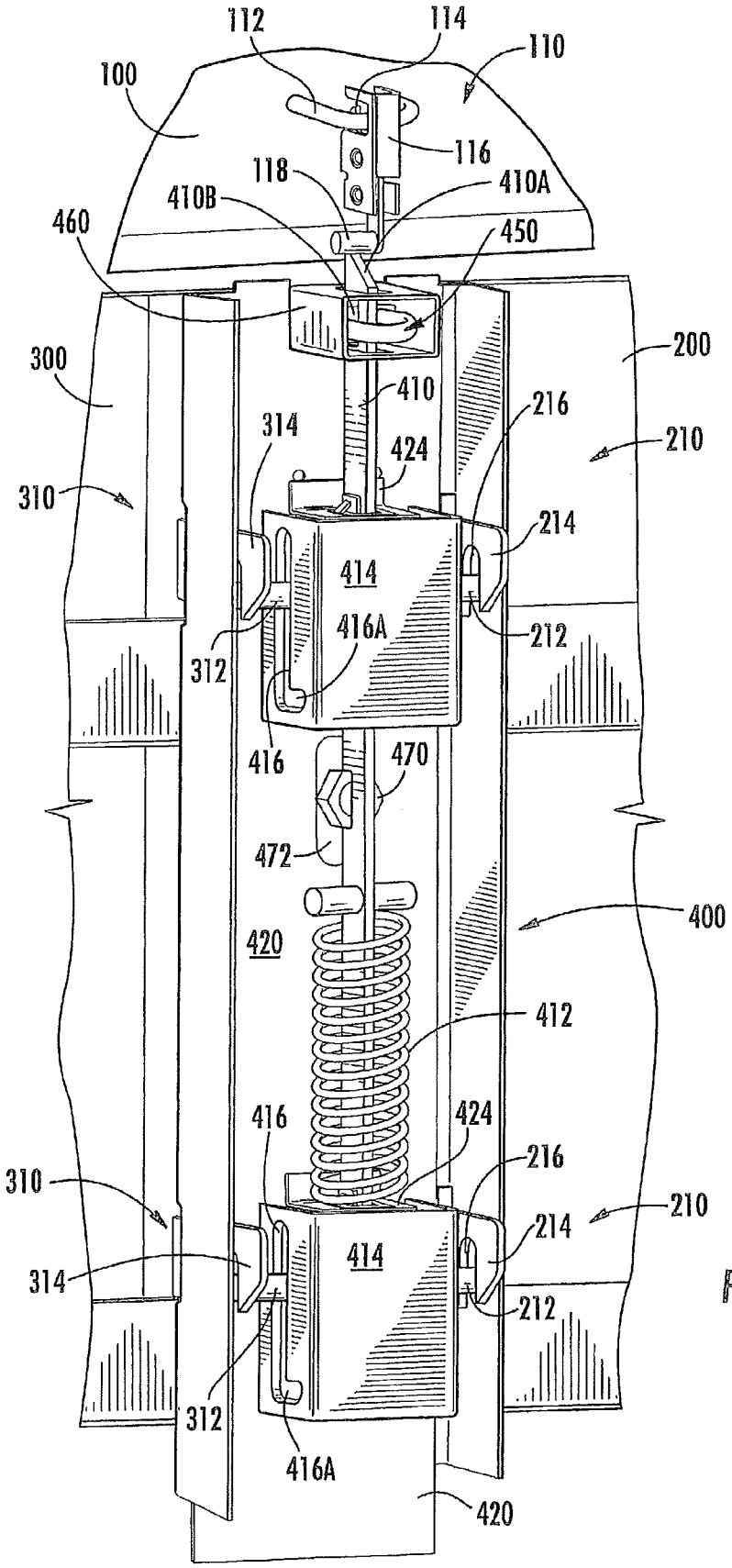
FIG. 2 is a perspective views of the interior of the container of FIG. 1 showing an integrated locking system for operating three latch units associated with respective doors of the container in which the latch units are in the latched position and the locking system is locked to prevent unauthorized access.

With continued reference to FIGS. 2-8 and FIG. 11, the latch unit 110 includes an engagement member or ring 112 mounted on the door 100 and a retaining member or hook 114 mounted on a bracket 116 having a lever 118. The bracket 116 is mounted on the receptacle 12. The latch units 210, 310 each include an engagement member or rod 212 and 312, respectively, that is mounted to the locking bar 410 and a corresponding engagement member or hook 214 and 314, respectively, that is mounted to the respective doors 200 and 300. As shown in FIG. 11, the hooks 214 and 314 are received in the openings 420A and engage the rods 212 and 312 as shown in FIG. 2.

Figure 9:
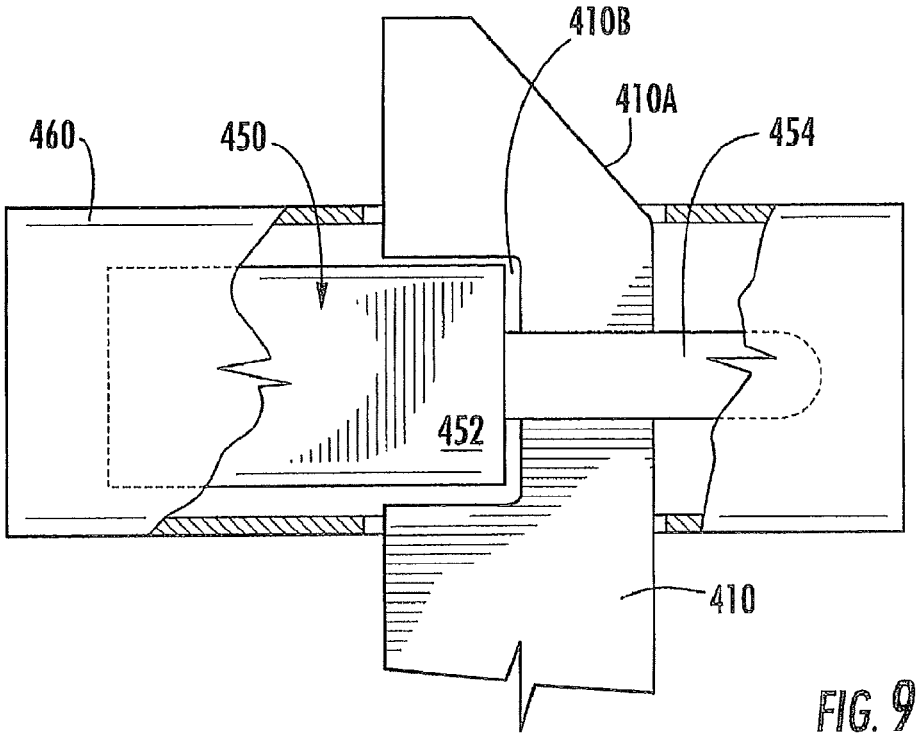
FIG. 9 is a broken side sectional view of the padlock and locking bar of the locking system of FIGS. 2-8 in which the padlock blocks movement of the locking bar.

As shown in FIG. 2, the latch units 110, 210 and 310 are each in a latched position in which the respective doors 100, 200 and 300 are maintained in the closed position. In particular, the retaining hook 114 retains the ring 112 therein to thereby latch the door 100 in the closed position. The rods 212 and 312, which are mounted to the locking rod 410, are retained by the hooks 214 and 314, which are mounted on the respective doors 200 and 300 to maintain the doors 200 and 300 in the latched position. In addition, as illustrated in FIGS. 2 and 9, the hook 454 of the padlock 450 is in a locked position such that a portion of the padlock body 452 is within the notch 410B of the locking bar 410. In this position, the padlock body 452 prevents the locking bar 410 from moving in a vertical direction.

Figure 3:
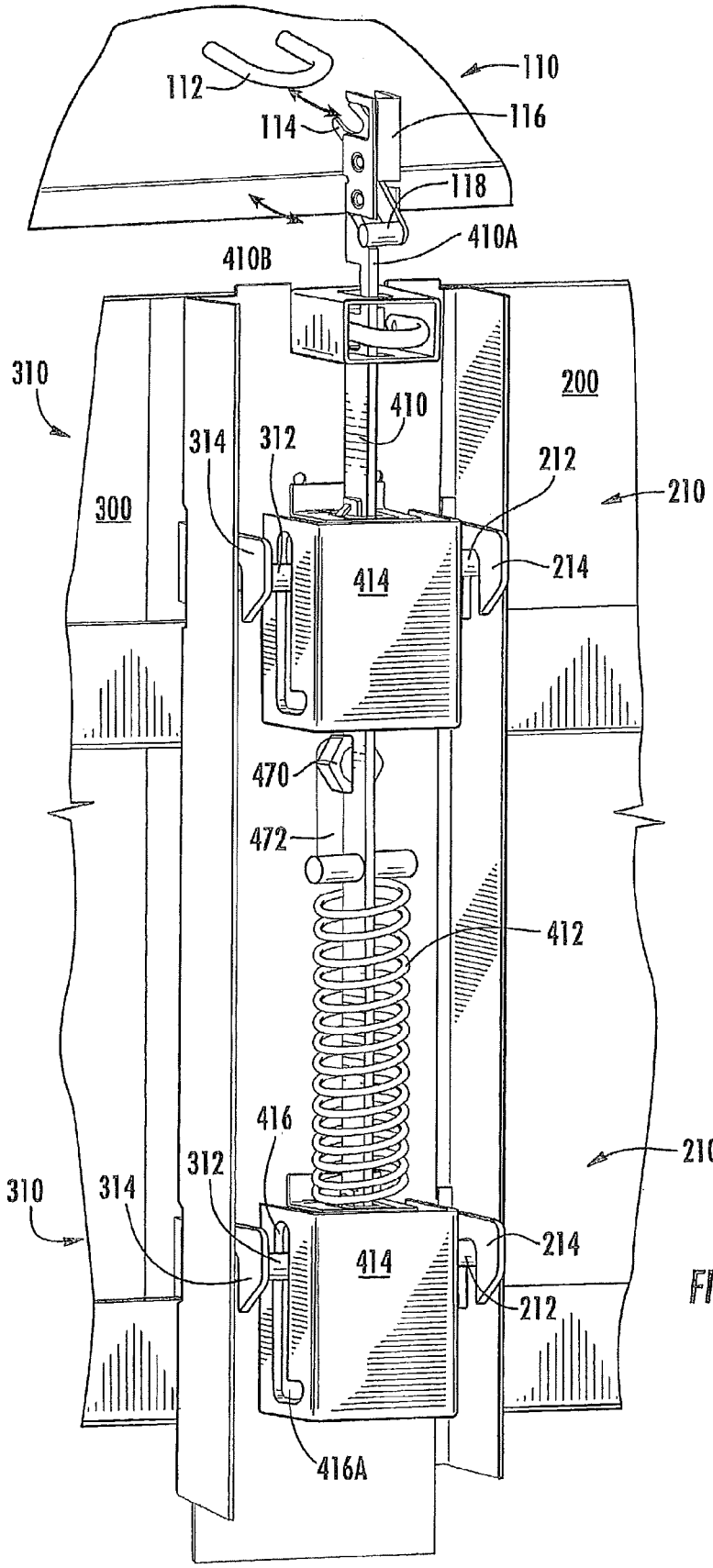
FIG. 3 is a perspective view of the integrated locking system of FIG. 2 in which the first of the three latch units is in the unlatched position and the second and third latch units are in the latched position.
Figure 10:
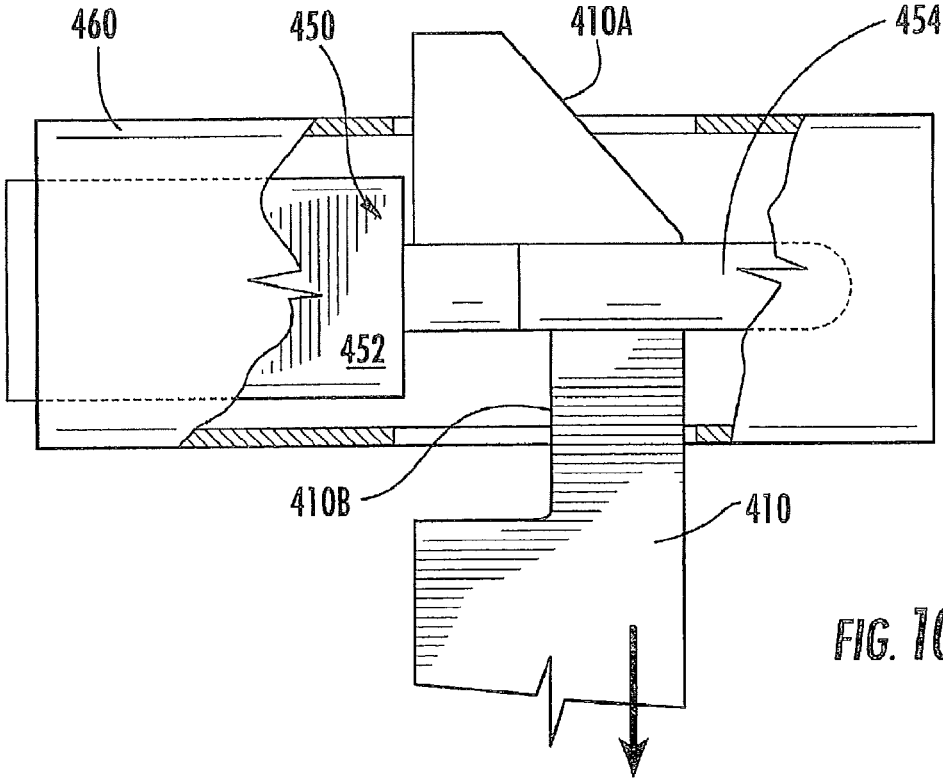
FIG. 10 is a broken side sectional view of the padlock and locking bar of FIG. 9 in which the padlock is opened and allows movement of the locking bar.

As shown in FIGS. 3 and 10, the padlock 450 is opened such that an end of the hook 454 separates from the body 452 and no longer blocks movement of the locking bar 410. In this position, the locking bar 410 can be moved in the vertical direction by an operator via the handle 470. However, when the padlock 450 is unlocked, the biasing spring 412 biases the locking bar 410 in the position shown in FIG. 2 such that the latch units 110, 210 and 310 remain in the latched position.

Figure 4:
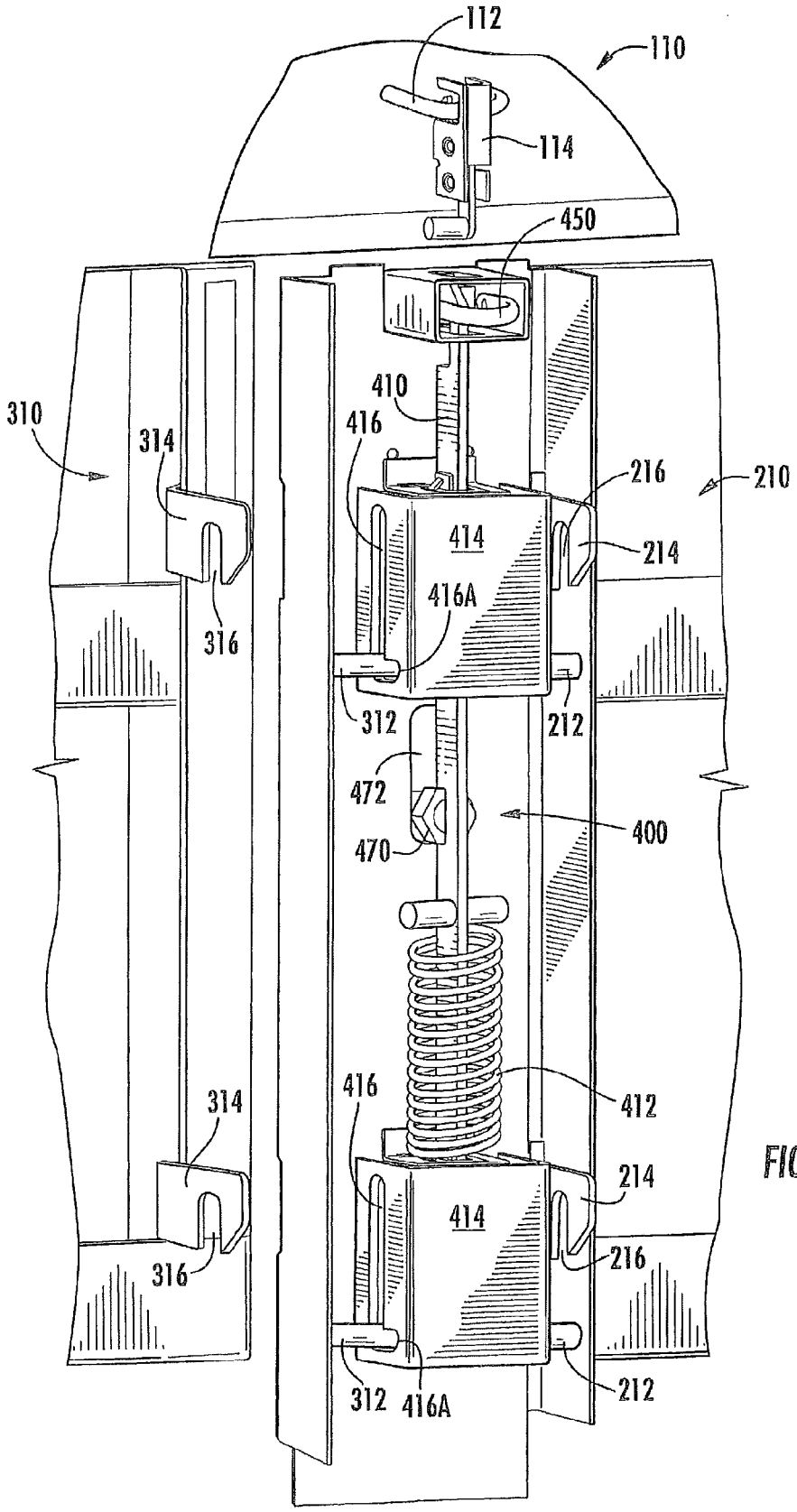
FIG. 4 is a perspective view of the integrated locking system of FIG. 2 in which the first latch unit is in the latched position and the second and third latch units are in the unlatched position.

As shown in FIG. 3, the handle 470 of the locking bar 410 can be moved upward by an operator when the padlock 450 is opened. The tapered end 410A of the locking bar 410 moves the lever 118 in a rotational direction, which in turn rotates the hook 114 to release the ring 112. In this position, the latch unit 110 is in the unlatched position so that the door 100 is unlatched and moves freely from the closed to the opened position. If the locking bar 410 is lowered such that the end 410A does not push the lever 118 into the open position shown in FIG. 3, then the door 100 may be latched by closing door 100 so that the ring 112 is received in the hook 114, which rotates back to the closed position as shown in FIG. 4. With continued reference to FIG. 4, the operator can move the handle 470 and locking bar 410 downward such that the rods 212 and 312 are released from the slots 216 and 316 of the hooks 214 and 314. In this position, the latch units 210 and 310 are in the unlatched position so that the doors 200 and 300 can be moved between the latched and the unlatched position. If the operator releases the handle 470, the spring 412 biases the locking bar 410 to the position illustrated in FIG. 2 so that if the doors are closed, the hooks 214 and 314 engage the rods 212 and 312.

In this configuration, the operator can open either the upper door 100 while the lower doors 200 and 300 remain in the latched position as shown in FIG. 3 or the operator can open the lower doors 200 and 300 while the upper door 100 remains in the latched position. Accordingly, the upper door 100 and the lower doors 200 and 300 can be latched or unlatched independently from one another. In some embodiments, an operator can maneuver the handle 470 with one hand to move the locking bar 410 to independently latch or unlatch the latch unit 110 of the door 100 or the latch units 210 and 310 of the doors 200 and 300, respectively. In addition, the padlock 450 can block movement of the locking bar 410 as shown in FIG. 2 so that the latch units 110, 210 and 310 are maintained in the latched position and unauthorized access to the container 10 is prevented.

Figure 5:
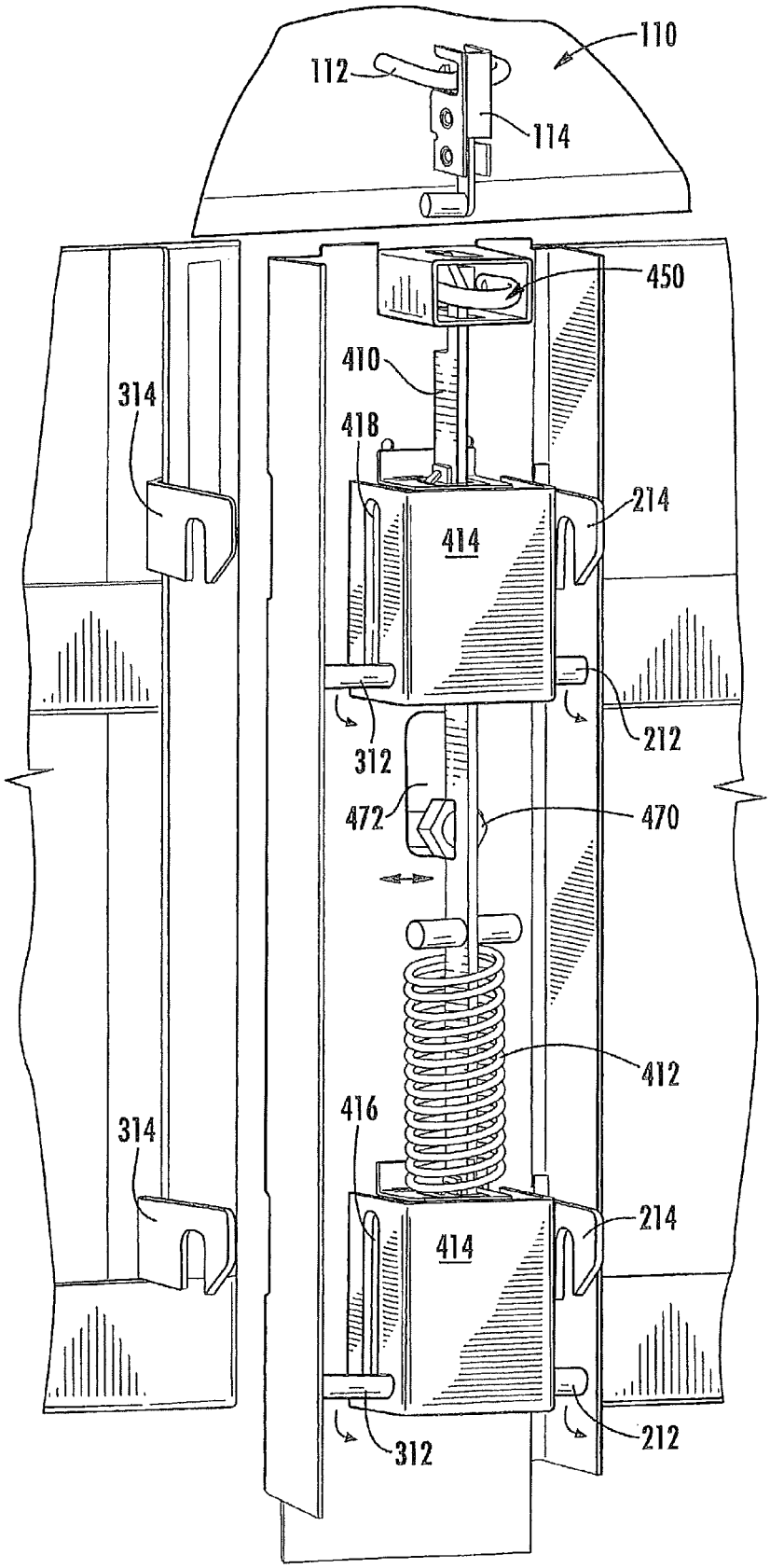
FIG. 5 is a perspective view of the integrated locking system of FIG. 2 in which the locking system maintains the second and third latch units in an unlatched position.

In some embodiments, the operator can move the handle 470 from the position shown in FIG. 4 so that the rods 212 and 312 are retained in respective retaining portions 416A of the slots 416 as shown in FIG. 5. In this position, the operator can release the handle 470, and the rods 212 and 312 are retained in the respective retaining portions 416A of the slots 416 to prevent the biasing spring 412 from moving the locking bar 410 to the position of FIG. 2. In this configuration, the doors 200 and 300 remain in the unlatched position without further operator intervention.

Figure 6:
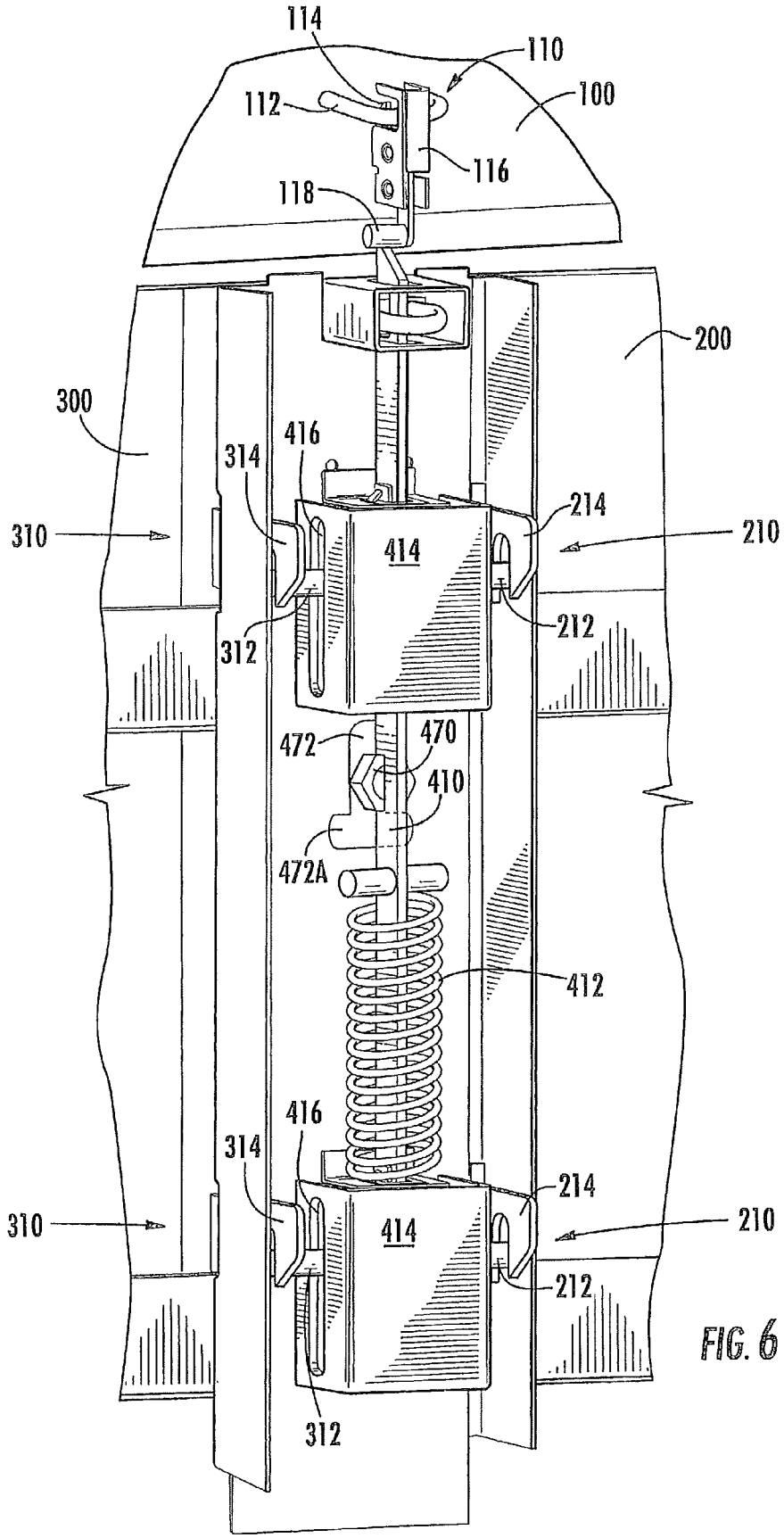
FIG. 6 is a perspective view of the interior of the container of FIG. 1 showing an alternative integrated locking system for operating three latch units associated with respective doors of the container according to embodiments of the present invention.
Figure 7:
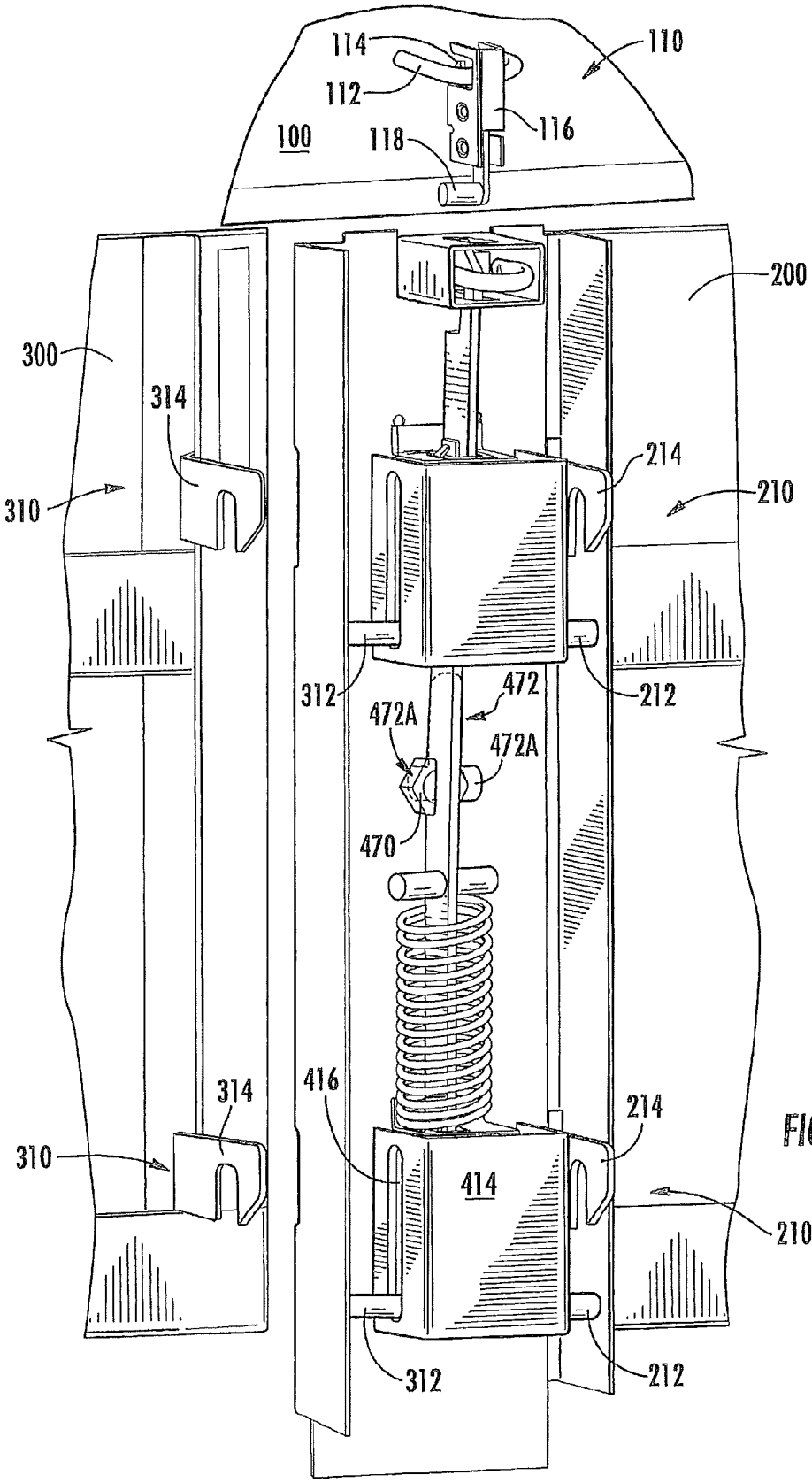
FIG. 7 is a perspective view of the locking system of FIG. 6 in which the locking system maintains the second and third latch units in an unlatched position.
Figure 8:
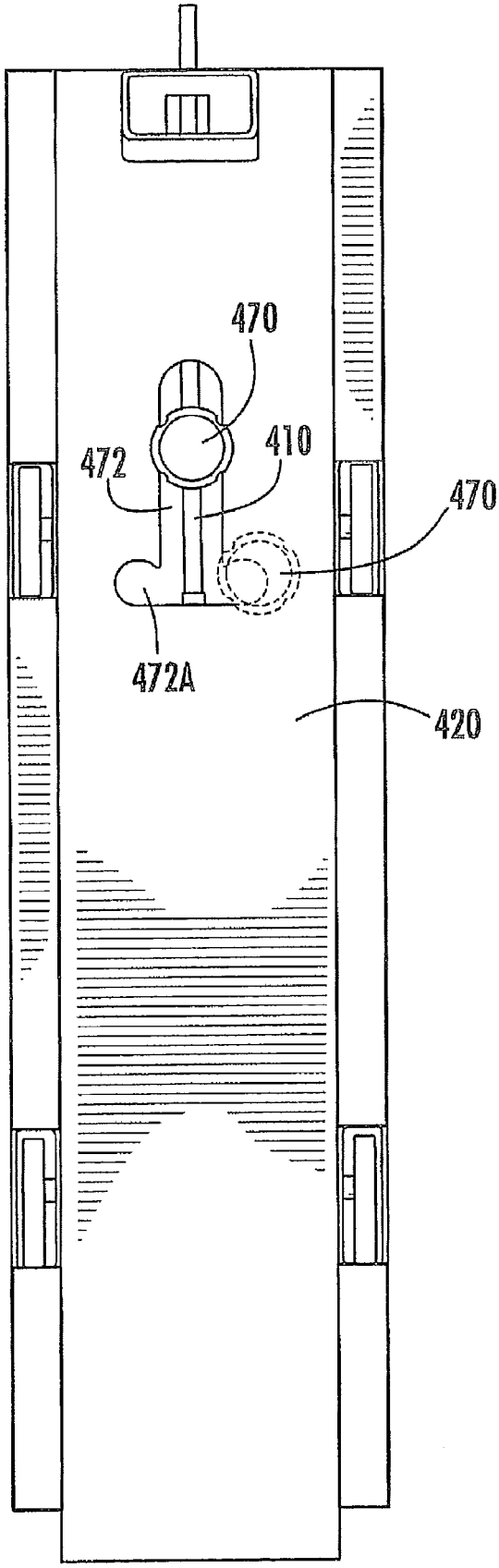
FIG. 8 is a front view of the locking system of FIGS. 6-7.

Alternatively, as shown in FIGS. 6-8, the retaining portions 416A of the slots 416 can be omitted. The slot 472 can include a retaining portion 472A such that the locking bar 410 can be moved from the locked position shown in FIG. 6 and retained by the retaining portion 472A in an unlatched position shown in FIGS. 7 and 8. As illustrated in FIGS. 7 and 8, the handle 470 is retained in the retaining portion 472A so that the operator can release the handle 470 and the locking bar 410 is maintained in the unlatched position with respect to the doors 200 and 300. In other words, by retaining the handle 470 in the retaining portion 472A, the biasing spring 412 is prevented from biasing the locking bar 410 into the locked position shown in FIG. 2.

Figure 19:
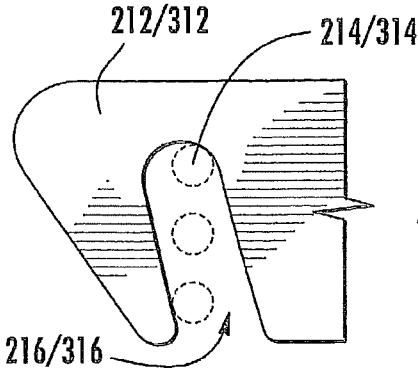
FIG. 19 is side view of a hook from a latch unit of the systems shown in FIGS. 2-8 and 11-18.

In some embodiments shown in FIG. 19, the hooks 212 or 312 can include a tapered slot 216 or 316, which urges the doors 200 and 300 toward the receptacle 12.

In alternative embodiments illustrated in FIGS. 12-18, the slot 472 has a shape that defines five positions for the handle 470: an up position U, a down position D, a right position R, a left position L and a center position C. As illustrated in FIGS. 13-18, the locking system 400 includes springs 430, which bias the locking bar 410 and handle 470 in the down position D, and a holding member 432. The springs 430 are connected to the bracket 414 at one end and are connected to the rods 212 and 312 at the other end. The spring 412 further biases the locking bar 410 in the down position D shown in FIG. 13.

Figure 13:
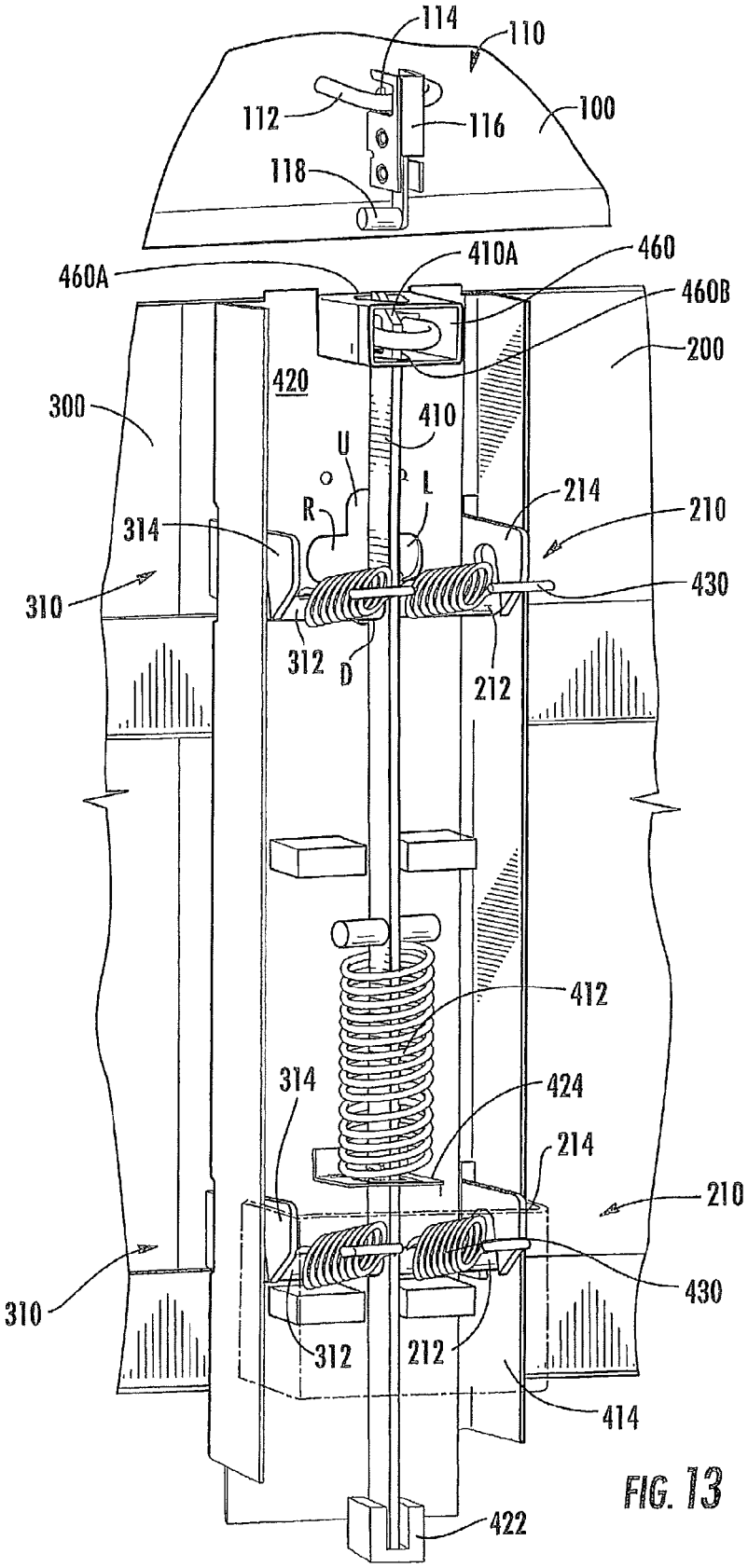
FIG. 13 is a perspective view of the interior of the container of FIG. 1 showing the integrated locking system of FIG. 12 for operating three latch units associated with respective doors of the container in which the three latch units are in the latched position.
Figure 14:
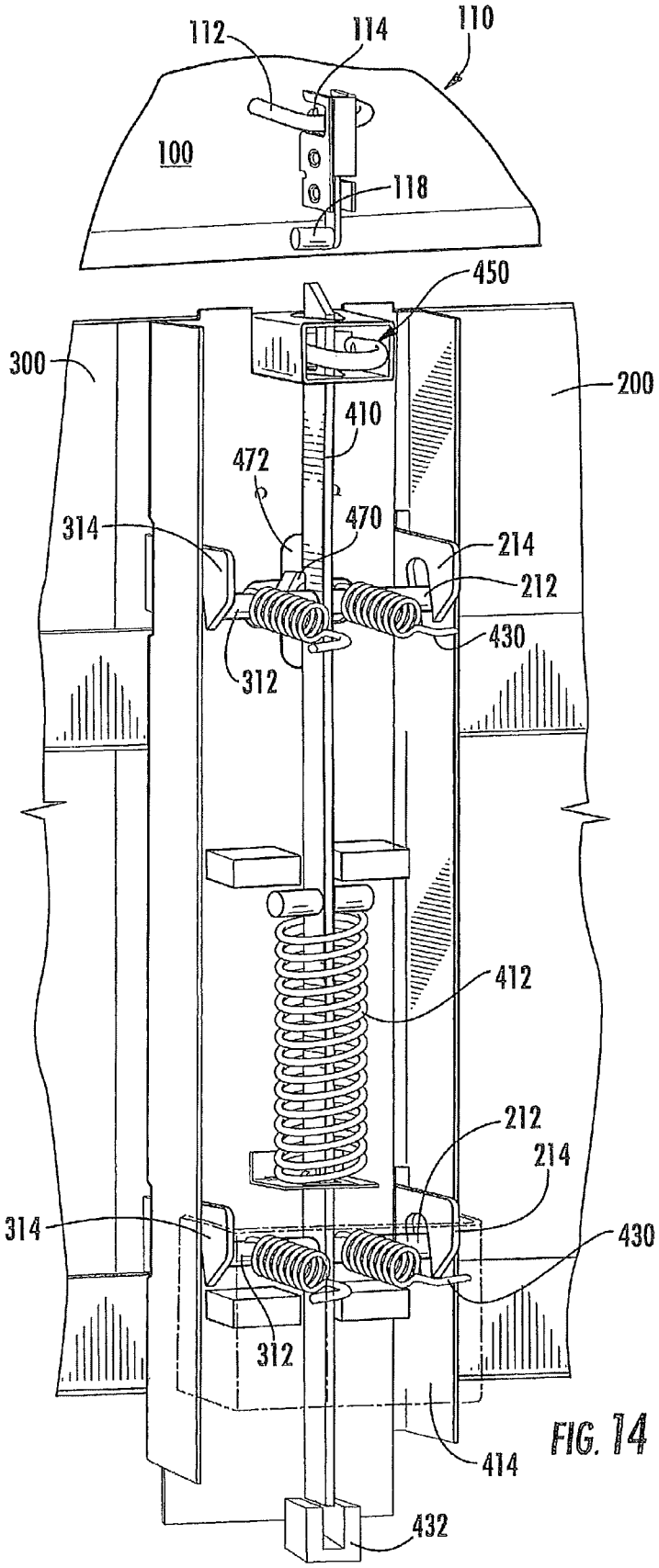
FIG. 14 is a perspective view of the locking system of FIG. 13 in which the locking bar of the locking system moves upward to the center position.

When the locking bar 410 and handle 470 are in the down position D as shown in FIG. 13, the three latch units 110, 210 and 310 are in the latched position, and the locking bar 410 is retained in the holding member 432 such that rotational movement of the locking bar 410 and/or movement to the left position L or right position R is prevented. When an operator moves the handle 470 to the center position C as shown in FIG. 14, the locking bar 410 moves upward and is released from the holding member 432 such that rotational movement and/or movement of the locking bar 410 to the left position L or the right position R is permitted.

Figure 15:
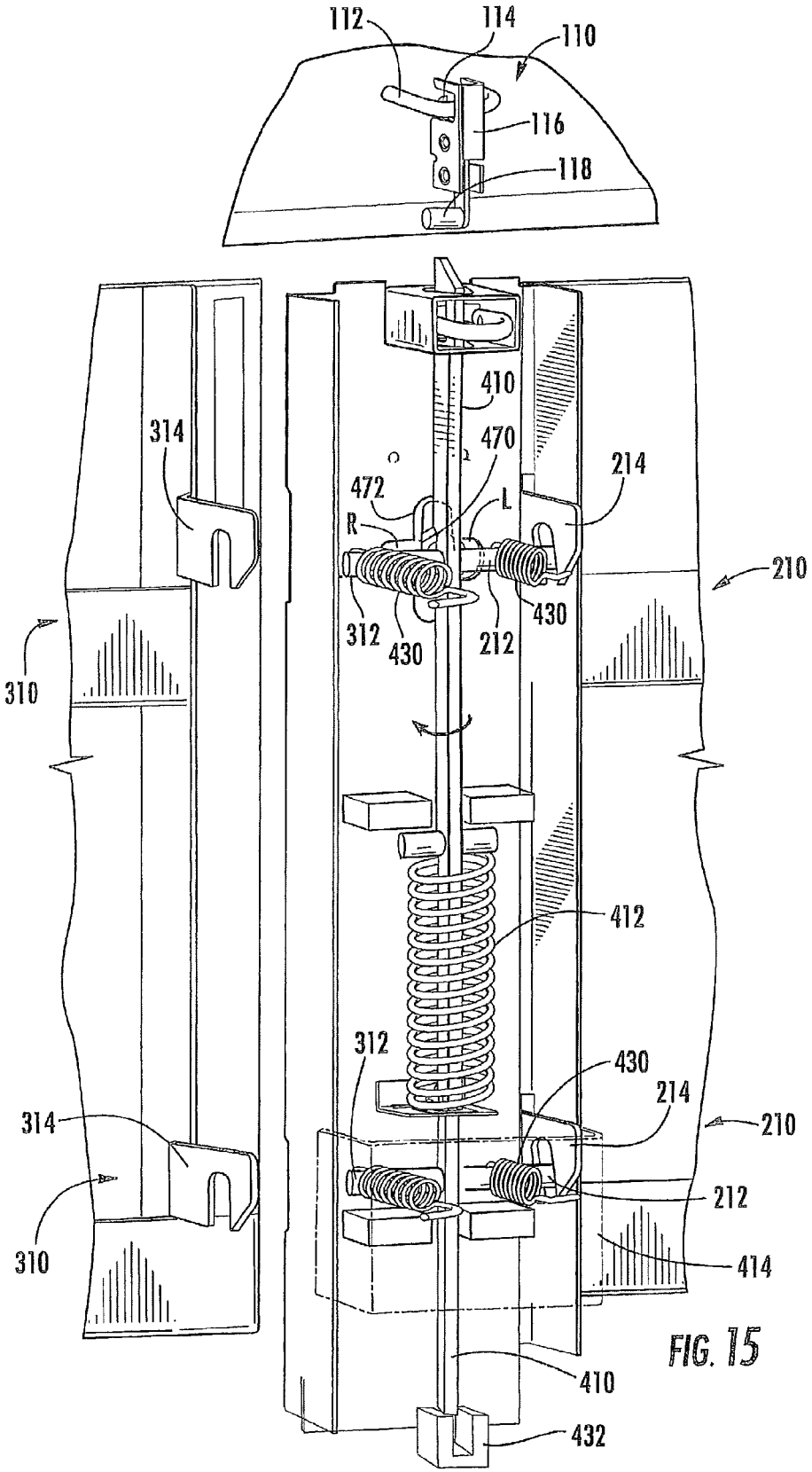
FIG. 15 is a perspective view of the locking system of FIG. 13 in which the locking bar is moved to the left position such that one of the side latch units is in the unlatched position.
Figure 18:
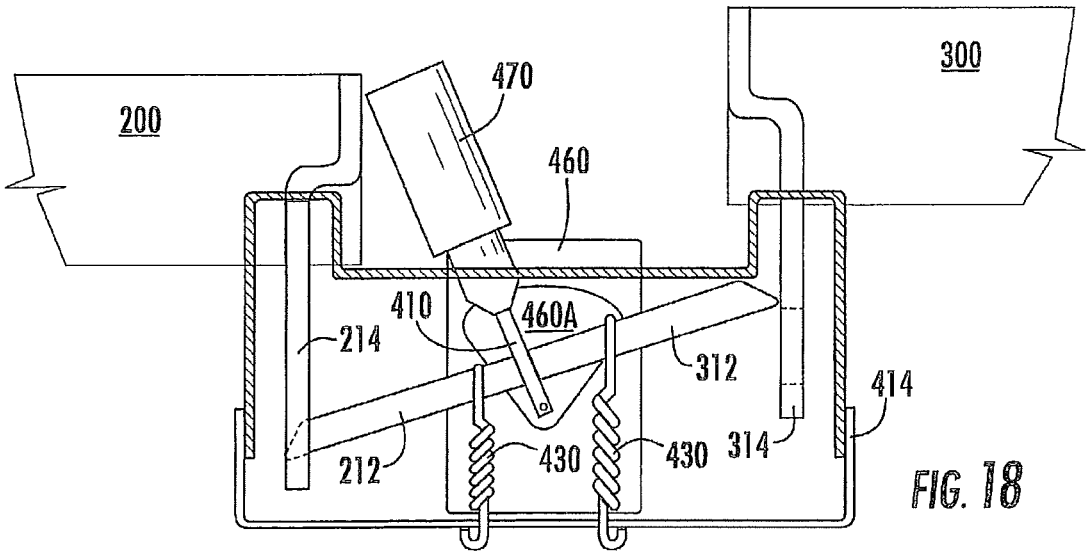

As shown in FIG. 15 and in FIG. 18, when the handle 470 and the locking bar 410 are moved by an operator to the left position L, the locking bar 410 pivots and moves the rod 312 to release to rods 312 from the hooks 314. Consequently, the latch unit 310 is unlatched, and the door 300 is in the open position. However, the latch unit 210 remains latched, and the door 200 is in the closed position. It should be understood that if the handle 470 and the locking bar 410 are moved to the right position R, the locking bar 410 pivots in the opposite direction to likewise release the rods 212 from the hooks 214 so that the door 200 is unlatched, but the door 300 is latched. In this configuration, the side doors 200 and 300 can be unlatched or latched independently of one another. When the handle 470 is released by the operator, the springs 430 biases the handle 470 and the locking bar 410 to a center position C, and the spring 412 further biases the handle 470 and the locking bar 410 to the downward position D or latched position shown in FIG. 13.

Figure 16:
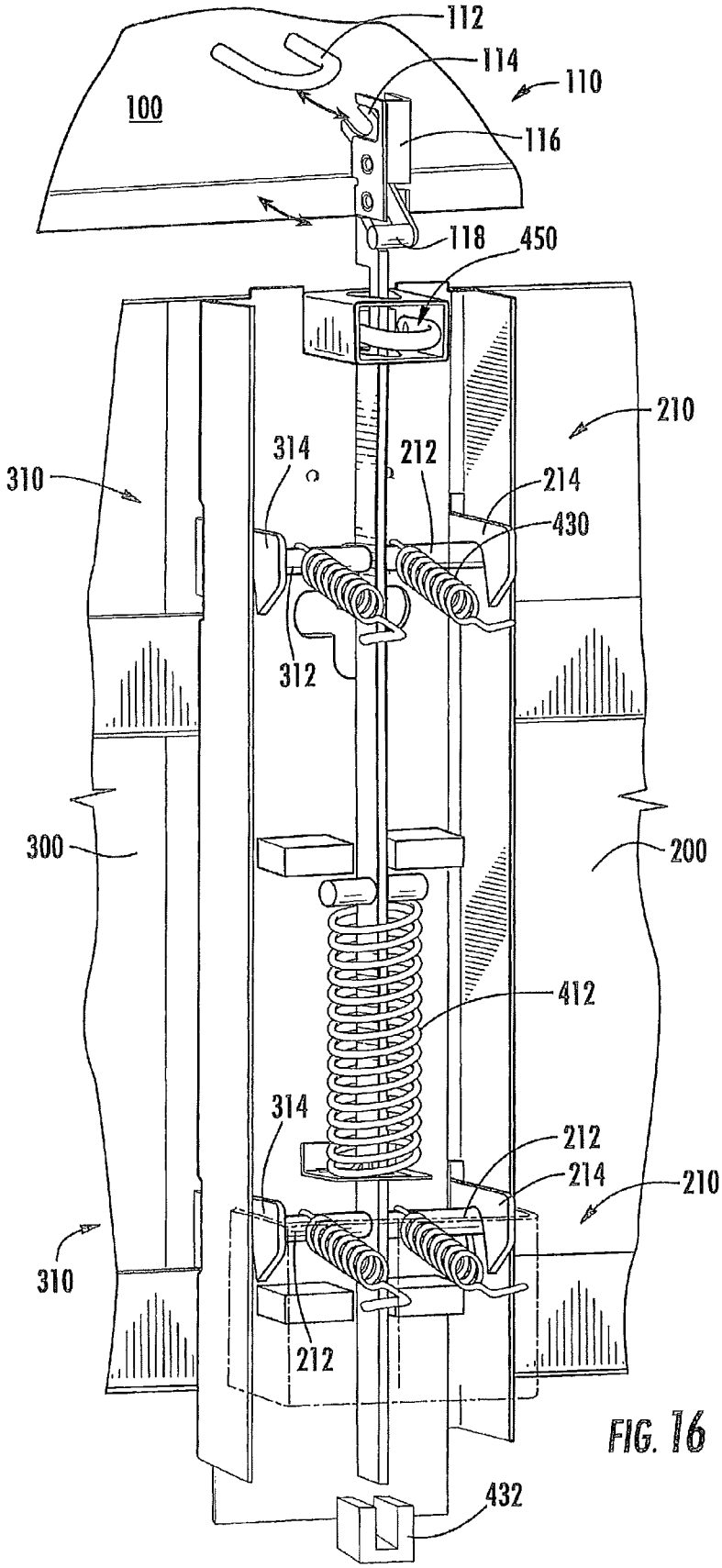
FIG. 16 is a perspective view of the locking system of FIG. 13 in which the locking bar is moved to the up position to move the upper latch unit to the unlatched position.
Figure 17:
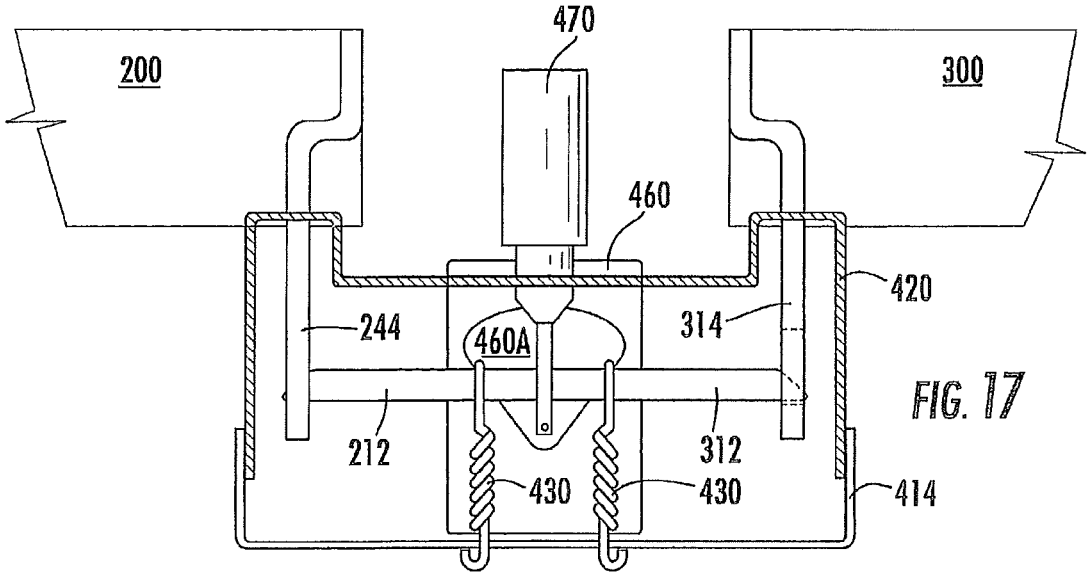
FIGS. 17 and 18 are top cross sectional views of the integrated locking system of FIGS. 12-16.

As illustrated in FIG. 16, the handle 470 and locking bar 410 can be moved by an operator to the up position U so that tapered end 410A of the locking bar 410 moves the lever 118 in a rotational direction. The lever 118 moves the hook 114 in a rotational direction to release the ring 112. In this position, the latch unit 110 is in the unlatched position so that the door 100 is unlatched and moves freely from the closed to the opened position. If the locking bar 410 is lowered such that the end 410A does not push the lever 118 into the open position shown in FIG. 16, then the door 100 may be latched by closing door 100 so that the ring 112 is received in the hook 114, which rotates back to the closed position as shown in FIGS. 13-15.

Although embodiments of the current invention are illustrated with respect to the latch units 110, 210 and 310, it should be understood that alternative latching configurations can be used. For example, the configuration of the latch unit 110 including the ring 112 and hook 114 can be incorporated into the side door latch units 210 and 310 or, alternatively, the retaining member or bar 212 and 312 and hooks 214 and 314 of the latch units 210 and 310, respectively, can be incorporated into the top door 100 to permit independent latching of the doors 100, 200 and 300 as described herein. In addition, although the integrated locking system has been described with respect to the container 10, which includes three doors 100, 200 and 300, it should be understood that the features of the current invention can be incorporated into two door configurations, or configurations with four or more doors.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A container, comprising:

a receptacle having walls, a floor, and an open side;

first and second doors, each of the first and second doors being pivotally attached to a respective wall of the receptacle, each of the first and second doors being movable between an open position, in which a portion of the open side of the receptacle can be accessed, and a closed position, in which the first and second doors overlie the open side of the receptacle, at least one first latch unit operatively associated with the first door that is movable between a latched position in which the first door is maintained in the closed position and an unlatched position in which the first door is movable between the open and the closed positions;

at least one second latch unit operatively associated with the second door that is movable between a latched position in which the second door is maintained in the closed position and an unlatched position in which the second door is movable between the open and the closed positions; and a locking system coupled to the first and second latch units for moving the first and second latch units between the latched and the unlatched positions, the locking system comprising:

a locking member movable between a first position in which the locking member moves the first latch unit of the first door from the latched to the unlatched position and a second position in which the locking member moves the second latch unit of the second door from the latched to the unlatched position.

2. The container of claim 1, wherein the second latch unit is configured to retain the second door in the latched position when the locking member is in the first position.

3. The container of claim 1, wherein the first latch unit comprises a retaining member mounted on one of the receptacle and the first door and an engagement member mounted on the other of the receptacle and the first door so that the retaining member retains the engagement member in the latched position and the retaining member releases the engagement member in the unlatched position.

4. The container of claim 3, wherein the locking member comprises an elongated member having one end that is configured to move the retaining member from the latched position to the unlatched position.

5. The container of claim 4, wherein the second latch unit comprises a first engagement member on a side of the elongated member configured to engage a second engagement member on the second door to retain the second door in the latched position.

6. The container of claim 5, wherein the second engagement member on the second door includes a slot configured to retain the first engagement member on the elongated member.

7. The container of claim 6, wherein the slot is tapered at an angle configured to bias the second door in a direction toward the container.

8. The container of claim 1, further comprising a biasing member configured to bias the locking member in a third position in which the locking member is disengaged from the first latch unit of the first door and the second latch unit is in the latched position.

9. The container of claim 1, further comprising:

a third door pivotally attached to one of the walls of the receptacle and movable between an open position, in which a portion of the open side of the receptacle can be accessed, and a closed position, in which the third door over lines the open side of the receptacle; and at least one third latch unit operatively associated with the third door that is movable between a latched position in which the third door is maintained in the closed position in an unlatched position in which the third door is movable between the open and closed position;

wherein when the locking member is in the second position, the locking member moves the third latch unit of the third door from the latched to the unlatched position.

10. The container of claim 1, wherein the first door is positioned above the second door.

11. The container of claim 1, further comprising a handle member accessible from an exterior of the receptacle and configured to move the locking member between the first position and the second position.

12. The container of claim 1, further comprising a blocking member accessible from an exterior of the receptacle and configured to block movement of the locking member in a locked position and to permit movement of the locking member in an unlocked position.

13. The container of claim 12, wherein the blocking member is a padlock.

14. A container, comprising:

a receptacle having walls, a floor, and an open side;

first, second and third doors pivotally attached a respective one of the walls of the receptacle, each of the first, second and third doors being movable between an open position, in which a portion of the open side of the receptacle can be accessed, and a closed position, in which the first, second and third doors overlie the open side of the receptacle;

at least one first latch unit operatively associated with the first door that is movable between a latched position in which the first door is maintained in the closed position and an unlatched position in which the first door is movable between the open and closed positions;

at least one second latch unit operatively associated with the second door that is movable between a latched position in which the second door is maintained in the closed position and an unlatched position in which the second door is movable between the open and closed positions;

at least one third latch unit operatively associated with the third door that is movable between a latched position in which the third door is maintained in the closed position and an unlatched position in which the third doors movable between the open and closed positions;

a locking system coupled to the first, second and third latch units for moving the first, second and third latch units between the latched and the unlatched position, the locking system comprising:

a locking member movable between a first position in which the locking member moves the first latch unit of the first door from the latched to the unlatched position, a second position in which the locking member moves the second latch unit of the second door from the latched to the unlatched position and a third position in which the locking member moves the third latch unit from a latched to the unlatched position.

15. The container of claim 14, wherein the second and third latch units are configured to retain the second and third doors in the latched position when the locking member is in the first position.

16. The container of claim 14, wherein the first latch unit comprises a retaining member mounted on one of the receptacle and the first door and an engagement member mounted on the other of the receptacle and the first door so that the retaining member retains the engagement member in the latched position and the retaining member releases the engagement member in the unlatched position.

17. The container of claim 16, wherein the locking member comprises an elongated member having one end that is configured to move the retaining member from the latched position to the unlatched position.

18. The container of claim 15, wherein the locking member comprises an elongated member and the second latch unit comprises a first engagement member on a side of the elongate member, and the third latch unit comprises a second engagement member on the side of the elongate member, the first engagement member configured to engage a third engagement member on the second door to retain the second door in the latched position, and the second engagement member configured to engage a fourth engagement member on the third door to retain the third door in the latched position.

19. The container of claim 18, wherein the locking member is configured to retain the second latch unit in the latched position when the locking member is in the third position, in which the locking member moves the third latch unit from the latched to the unlatched position, and to retain the third latch unit in the latched position when the locking member is in the second position, in which the locking member moves the second latch unit from the latched to the unlatched position.

20. The container of claim 18, wherein the elongated member is configured to rotate between the second and third positions.

21. The container of claim 20, wherein the elongated member is configured to translate vertically to the first position.

22. The container of claim 15, further comprising a biasing member configured to bias the locking member in a fourth position in which the locking member is disengaged from the first latch unit of the first door and the second and third latch units are in the latched position.

23. The container of claim 14, further comprising a handle member accessible from an exterior of the receptacle and configured to move the locking member between the first position, the second position and the third position.

24. The container of claim 14, further comprising a blocking member accessible from an exterior of the receptacle and configured to block movement of the locking member in a locked position and to permit movement of the locking member in an unlocked position.

25. A container, comprising:

a receptacle having walls, a floor, a ceiling and an open side;

a first door pivotally attached to the ceiling and second and third doors pivotally attached a respective one of the walls of the receptacle, each of the first, second and third doors being movable between an open position, in which a portion of the open side of the receptacle can be accessed, and a closed position in which the first, second and third doors overlie the open side of the receptacle;

at least one first latch unit operatively associated with the first door that is movable between a latched position in which the first door is maintained in the closed position and an unlatched position in which the first door is movable between the open and closed positions;

at least one second latch unit operatively associated with the second door that is movable between a latched position in which the second door is maintained in the closed position and an unlatched position in which the second door is movable between the open and closed positions;

at least one third latch unit operatively associated with the third door that is movable between a latched position in which the third door is maintained in the closed position and an unlatched position in which the third doors movable between the open and closed positions;

a locking system coupled to the first, second and third latch units for moving the first, second and third latch units between the latched and the unlatched position, the locking system comprising:

a locking member movable between a first position in which the locking member moves the first latch unit of the first door from the latched to the unlatched position, a second position in which the locking member moves the second latch unit of the second door from the latched to the unlatched position and a third position in which the locking member moves the third latch unit from a latched to the unlatched position.

*26. A container, comprising:*

*a receptacle having walls, a floor, and a ceiling defining an interior, and at least one opening through which the interior is accessible;*

*first and second doors, each of the first and second doors being attached to a respective one of the walls, the floor and the ceiling of the receptacle, each of the first and second doors being movable between an open position, in which a portion of the interior of the receptacle can be accessed, and a closed position, in which the first and second doors overlie the at least one opening of the receptacle,*

*at least one first latch unit operatively associated with the first door that is movable between a latched position in which the first door is maintained in the closed position and an unlatched position in which the first door is movable between the open and the closed positions;*

*at least one second latch unit operatively associated with the second door that is movable between a latched position in which the second door is maintained in the closed position and an unlatched position in which the second door is movable between the open and the closed positions; and*

*a locking system coupled to the first and second latch units for moving the first and second latch units between the latched and the unlatched positions, the locking system comprising:*

*a locking member movable between a first position in which the locking member moves the first latch unit of the first door from the latched to the unlatched position and a second position in which the locking member moves the second latch unit of the second door from the latched to the unlatched position.*

*27. The container of claim 26, wherein the at least one opening further comprises a first opening and a second opening and the first door overlies the first opening in the closed position and the second door overlies the second opening in the closed position.*

*28. The container of claim 26, wherein the first and second doors are pivotably attached to the receptacle.*

*29. The container of claim 28, wherein the first and second doors are attached to a first and a second of the walls of the receptacle.*

*30. The container of claim 27, further comprising a support bracket disposed between the first and second openings, wherein the locking system is mounted on the support bracket.*

*31. The container of claim 27, wherein the first door is attached to the ceiling and the second door is attached to a respective one of the walls.*

*32. The container of claim 1, wherein the second latch unit is configured to retain the second door in the latched position when the locking member is in the first position.*

*33. The container of claim 26, wherein the first latch unit comprises a retaining member mounted on one of the receptacle and the first door and an engagement member mounted on the other of the receptacle and the first door so that the retaining member retains the engagement member in the latched position and the retaining member releases the engagement member in the unlatched position.*

*34. The container of claim 33, wherein the locking member comprises an elongated member having one end that is configured to move the retaining member from the latched position to the unlatched position.*

*35. The container of claim 26, further comprising:*

*a third door pivotally attached to one of the walls, the floor and the ceiling of the receptacle and movable between an open position, in which a portion of the interior of the receptacle can be accessed, and a closed position, in which the third door overlies the at least one opening of the receptacle; and*

*at least one third latch unit operatively associated with the third door that is movable between a latched position in which the third door is maintained in the closed position and an unlatched position in which the third door is movable between the open and closed position.*

*36. A container, comprising:*

*a receptacle having walls, a floor, a ceiling and an open side;*

*first and second doors, each being attached to a respective one of the walls of the receptacle, each of the first and second doors being movable between an open position, in which a portion of the open side of the receptacle can be accessed, and a closed position, in which the first and second doors overlie the open side of the receptacle;*

*at least one first latch unit operatively associated with the first door that is movable between a latched position in which the first door is maintained in the closed position and an unlatched position in which the first door is movable between the open and closed positions;*

*at least one second latch unit operatively associated with the second door that is movable between a latched position in which the second door is maintained in the closed position and an unlatched position in which the second door is movable between the open and closed positions;*

*a locking system coupled to the first and second latch units for moving the first and second latch units between the latched and the unlatched position, the locking system comprising:*

*a locking member movable between a first position in which the locking member moves the first latch unit of the first door from the latched to the unlatched position, and a second position in which the locking member moves the second latch unit of the second door from the latched to the unlatched position.*

*37. The container of claim 36, further comprising:*

*a third door attached to a respective one of the walls and the ceiling of the receptacle; and*

*at least one third latch unit operatively associated with the third door that is movable between a latched position in which the third door is maintained in the closed position and an unlatched position in which the third doors movable between the open and closed positions;*

*wherein the locking member is movable to a third position in which the locking member moves the third latch unit from a latched to the unlatched position.*

*38. The container of claim 37, wherein the second and third latch units are configured to retain the second and third doors in the latched position when the locking member is in the first position.*

*39. The container of claim 36, wherein the open side further comprises a first opening and a second opening, and the first door overlies the first opening in the closed position and the second door overlies the second opening in the closed position.*

*40. The container of claim 39, wherein the first and second doors are pivotably attached to the receptacle.*

*41. The container of claim 39, further comprising a support bracket disposed between the first and the second openings, wherein the locking system is mounted on the support bracket.*

*42. The container of claim 37, wherein the open side further comprises a first, a second and a third opening, and the first door overlies the first opening in the closed position, the second door overlies the second opening in the closed position and the third door overlies the third opening in the closed position.*

*43. The container of claim 42, wherein the first, second and third openings are disposed on a single side of the receptacle and the first opening is disposed above the second and third openings.*

* * * * *